Oct. 29, 1957  J. BAILEY  2,810,934
METHOD OF MAKING PLASTIC BOTTLES
Filed Sept. 6, 1950
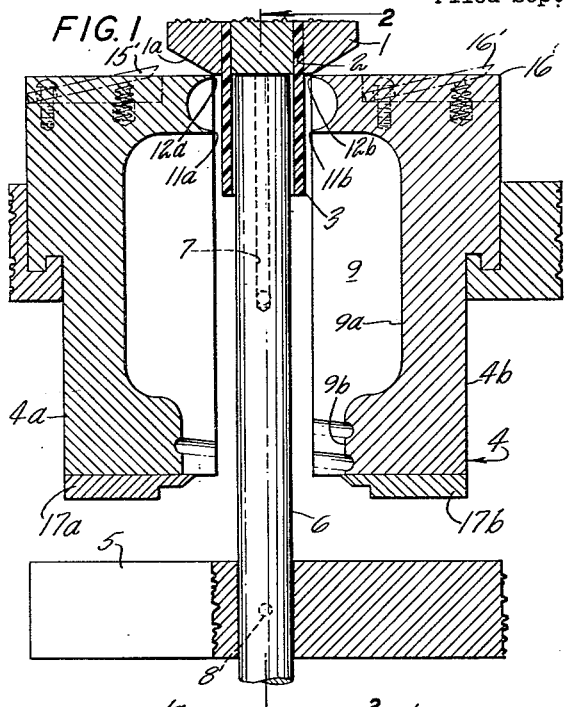
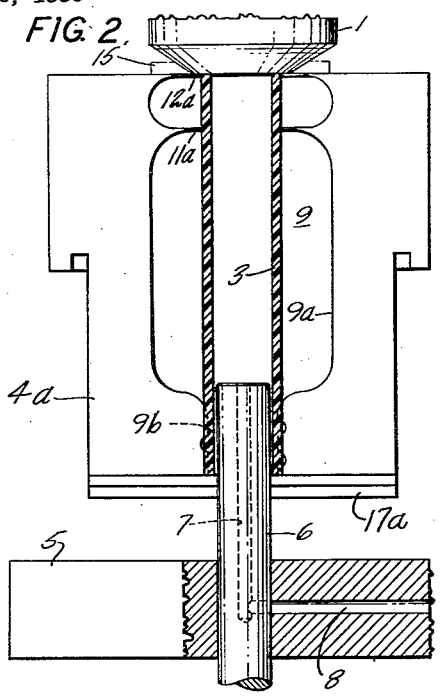
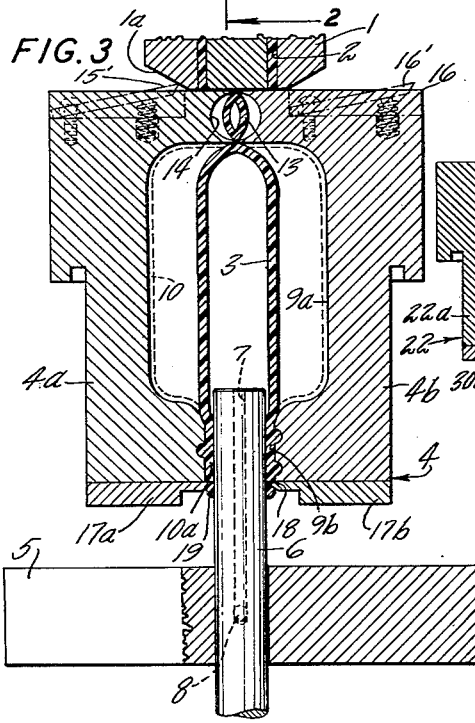
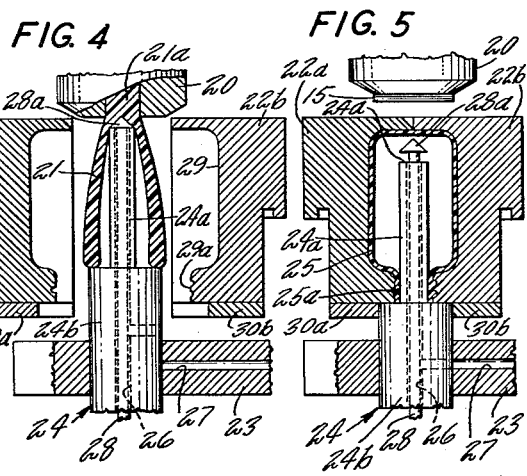
INVENTOR
JAMES BAILEY
BY *Parham & Bates*
ATTORNEYS

2,810,934
METHOD OF MAKING PLASTIC BOTTLES

James Bailey, West Hartford, Conn., assignor to Plax Corporation, West Hartford, Conn., a corporation of Delaware Application September 6, 1950, Serial No. 183,311

8 Claims. (Cl. 18—55)

The present invention relates to improvements in process for manufacturing blown thermoplastic resin bottles and the like.

An object of the invention is to provide process wherein a thermoplastic resin is extruded in either a solid or tubular stream from which a bottle or the like is formed by press molding its neck and corkage portions and blow molding its body portion within a single multi-section mold.

Another object is to provide a plastic bottle forming process wherein a bottle is formed from a length of a solid extruded plastic stream.

A further object is to provide process of the type indicated in which the extruded resin is severed from its parent supply prior to blow molding the finished article.

With these and other objects in view, the invention consists of the hereinafter described method of operation and the novel combinations, constructions and arrangement of parts shown in the accompanying drawings of two illustrative embodiments in which:

Figure 1 is a cross-sectional view of a tube of thermoplastic resin being extruded from a nozzle about a mandrel within an open multi-sectional mold in accordance with the invention;

Fig. 2 is a cross-sectional view taken on line 2—2 of Fig. 1 and showing the mandrel retracted and the plastic tube fully extruded preparatory to closing the mold sections;

Fig. 3 is a cross-sectional view, similar to Figs. 1 and 2, showing the bottle blow-molded in the closed mold and the neck and corkage press-molded by the mold and mandrel; and Figs. 4 and 5 are cross-sectional views similar to Figs. 1 and 3 showing a modification of the invention, wherein a solid stream of plastic is extruded from a nozzle onto a mandrel and thereafter shaped into a bottle by combination blow-and-press molding operation.

Referring to Figs. 1 to 3 of the drawings, there is shown an extrusion head or nozzle 1 having an annular outlet orifice 2 through which a heated or otherwise plasticized and suitable homogenized organic plastic resin such as, for example, polyethylene is extruded in tubular form or shape 3. The extrusion head 1 may be either stationarily or movably mounted as, for example, for vertical movement in the manner disclosed in U. S. Patent No. 2,349,176, issued May 16, 1944, to William H. Kopitke. In either case, it is contemplated that the head 1 be so disposed that mold sections 4a and 4b of a multisection mold 4 may be brought into registry with the extrusion head 1.

In the embodiment illustrated in Figs. 1–3, the mold sections 4a, 4b are mounted on a rotary turret table 5 which preferably carries a plurality of equally spaced apart molds (not shown) identical with mold 4, substantially as illustrated and described in the aforementioned Kopitke patent. As is hereinafter described in greater detail, the operation of the turret 5, and molds 4, may be automatically controlled in timed sequence with the operation of the extruder head 1 and other components of the apparatus by suitable timing mechanism (not shown).

Axially disposed within the mold 4 is a mandrel 6 which extends upwardly from the turret 5 in which it is mounted for vertical reciprocal movement.

A passageway 7 extends downwardly from the top of the mandrel 6 and communicates with an air pressure supply line 8 in the turret 5. The communication may be continually maintained and air pressure supplied intermittently, as from the timer (not shown) or, for example, the pressure may be continuously maintained in the supply line 8 and the communication with the passage 7 may be made only when the mandrel 6 is in the lower or retracted position shown in Fig. 3. It will be understood that the described means for intermittently supplying air pressure through the passage 7 in the mandrel 6 are merely illustrative and that a wide variety of alternatives may be employed to properly time and coordinate the air thus supplied with the several operations of the plastic blowing and molding apparatus.

The illustrated mold sections 4–a and 4–b form a mold cavity generally designated 9 in which to blow mold and shape the plastic tubing 3 into a narrow neck bottle 10 (Fig. 3).

In the embodiment shown in Figs. 1–3, the cavity 9 includes a main body portion 9a against which the tubing 3 is blow molded and a neck portion 9b which in cooperation with the mandrel 6 compression molds neck and corkage portion 10a of the bottle. The top of the mold sections 4a and 4b have cooperating pairs of edges 11a, 11b and 12a, 12b, each pair of which serve to pinch and virtually sever the tubing 3 along vertically spaced horizontal lines when the sections close on the tubing. The lower pair 11a, 11b close and form a bottom seam of the bottle 10 while the upper pair 12a, 12b serve to remove the portion of the tubing between the extrusion head 1 and the lower pair of edges 11a, 11b. In practice, the edges 11a, 11b and 12a, 12b may not completely sever the plastic tubing 3, in which case subsequent movement of the closed mold 4 out of registry with the head 1 completes the severance along the top pinch line. The flash 13 which is accommodated in a recess 14 of the mold between the edges may be readily trimmed from the bottle 10 along the lower pinch line after the bottle is removed from the mold.

As an alternative to the upper pinching edges 12a, 12b, or in combination therewith, a blade may be provided to wipe across and cleanly sever any depending plastic from the bottom of the head 1 after the mold sections 4a and 4b are closed. Such a blade 15 is schematically illustrated in the embodiment of the invention shown in Fig. 5 and, for example, may be similar in design and operation to the blade illustrated in the aforementioned Kopitke patent. An alternative arrangement is shown in phantom in Figs. 1 and 3 wherein a blade 15' is mounted on one of the mold sections 4a, and wipe across the bottom surface of the head 1 upon rotation of the turret 5 and movement of the mold 4 from left to right (Fig. 1) out of registry with the head 1. Preferably the blade 15' is spring urged upwardly and the head 1 is suitably beveled at least at the point of initial contact 1a with the blade 15' so that the latter is cammed downwardly by the bevel and the cutting edge of the blade rides across the lower surface of the head under spring pressure with a clean cutting stroke.

Other alternative cut-off blade arrangements may be employed and it will be understood that the present invention is not limited to the specific blade arrangements heretofore described.

In operating the forming apparatus shown in Figs. 1 to 3, the rotary turret 5 moves the open mold sections 4a, 4b into registry with the extrusion head 1, during which movement leading edge 16 (Fig. 1) of the mold section 4b or, as shown in phantom in Fig. 3, a spring pressed knife blade 16', similar to the blade shown at 15', may wipe across the lower surface of the head 1 and removes any depending plastic material immediately preparatory to the extrusion of a preselected length of tubing 3. Thereupon the preselected length of tubing 3 is extruded and the mandrel 6, which previously has been raised to receive and guide the leading end of the tubing, is automatically lowered as the tubing is extruded to the position shown in Fig. 2. Thereafter the mold sections 4a and 4b close and the tubing 3 is severed from the plastic supply in the head 1 by the upper pinching edges 12a, 12b while the edges 11a, 11b close the tubing and form a bottom seam for the inverted bottle 10. Concurrently, the neck portion 9b of the mold cavity 9 cooperates with the mandrel 6 to compression mold the lower portion of the suspended tubing into the neck and corkage 10a of the bottle.

Preferably, the wall thickness of the tubing 3 is somewhat greater than the clearance between the walls of the neck mold cavity 9b and the mandrel 6 so that the plastic resin may be firmly molded into thread portions or similar irregular depressions in the neck molding cavity.

As shown in Figs. 1–3, the mold sections 4a, 4b may be provided with a pair of end plates 17a, 17b from which semi-circular portions are cut away so as to form a circular orifice 18 which tightly engages the mandrel 6 when the mold sections are closed. The end plates 17a, 17b serve to seal the mold cavity 9 and mold the lip or finish of the inverted bottle.

The orifice 18 may have a cutting edge which virtually severs any excess portion of the tubing 3 that may extend below the finish plates 17a, 17b. Any thin flash which may remain between the orifice 18 and the mandrel 6 to connect the neck 10a of the bottle with excess plastic material 19 beneath the plates 17a, 17b is readily severed after removal of the bottle 10 from the mold 4. Severance may be aided or completed by withdrawing the mandrel 6 from the bottle before opening the mold sections. Preferably the withdrawal is effected with a rotary motion which may be imparted to the mandrel by a variety of means as, for example, threaded engagement of the mandrel 6 with turret 5.

It will be apparent that when excess material 19 collects beneath and is severed from the bottle 10, retraction of the mandrel 6 below the upper surface of the turret 5 provides for the ready removal of the material 19, as by a blast of air.

As soon as the mold sections 4a and 4b have closed, blowing air may be introduced into the plastic bubble within the mold through the passage 7 in the mandrel 6 and the turret 5 may be rotated so as to remove the mold 4 from beneath the extrusion head 1 so that one or more like molds (not shown) carried by the turret 5 may be successively positioned beneath the head 1 to repeat the extrusion and mold closing operations. In order to achieve optimum efficiency, the blowing operation may be commenced or continued at succeeding positions of the mold 4 and the bottle 10, or other molded article removed at a position just prior to again positioning the mold 4 beneath the head 1.

In addition to shaping and molding a finished article from a tubular extrusion as heretofore described with reference to the embodiment shown in Figs. 1–3, the invention also contemplates molding such an article from a solid extrusion.

The latter practice is effected in the embodiment illustrated in Figs. 4 and 5 wherein an extrusion head 20 is adapted to extrude a suitably plasticized solid stream 21 of plastic material at periodic timed intervals and in proper amounts for the formation of successive bottles within mold sections 22a and 22b of a blow mold 22. The extrusion head 20 of this particular embodiment of the invention is mounted for vertical movement in any suitable manner as, for example, in the same way as in the aforementioned Kopitke patent.

As in the case of the embodiment shown in Figs. 1 to 3, one or more molds 22 may be operably mounted on a rotary turret 23 for movement into and out of registry with the head 20.

Axially associated with each mold 22 is a mandrel 24 which is operably mounted in the turret 23. As shown in Figs. 4 and 5, the upper portion 24a of the mandrel 24 is generally tubular and has an enlarged lower portion 24b which together with the adjacent tubular portion 24a cooperates with the mold sections 22a and 22b to compression mold neck portion 25a of a bottle or other product 25.

The mandrel 24 is provided with an axially disposed hollow bore 26 which communicates with an air pressure supply line 27 in the turret 23 and supports a rod 28 for vertical movement. The upper end of the rod 28 includes a pointed cap portion 28a for piercing and axially penetrating the solid stream of plasticized material as the latter is extruded downwardly thereon from the extrusion head 20. The flated lower end of the pointed cap 28a overlies the top portion 24a of the mandrel 24 and prevents plastic from entering the hollow air passage 26.

The operation of the embodiment shown in Figs. 4 and 5 while subject to several modifications generally involves lowering the head 20 into extruding position relative to the open mold 22, as shown in Fig. 4, and extruding a preselected length of the plastic stream 21 downwardly onto the pointed tip 28a and about the upper portion 24a of the mandrel. If the plastic material is incapable of, or slow to flow downwardly about the mandrel 24, the latter may be adjusted so that upon upward movement it penetrates a desired distance into the confined plastic in the head 20. Thereafter, the mandrel 24 may be retracted either while the stream 21 is being extruded or after a sufficient amount of plastic has been discharged.

Regardless of whether all the mandrel portion 24a is encompassed by plastic in the manner shown in Fig. 4 before the mandrel 24 is retracted or the top portion only is encompassed, the mold sections 24a and 24b are closed when a sufficient length of plastic has been extruded so as to extend to the bottom of neck portion 29a of mold cavity 29.

The mold sections 22a and 22b cooperate with the mandrel 24 to press mold neck portion 25a of the bottle. The pressing of the neck 25a may be effected with the large portion 24b of the mandrel already abutting the bottom of the mold 22 as shown in Fig. 5 or the mandrel may be subsequently moved to the abutting position from a slightly lower position so that the upward movement of the mandrel 24 stuffs or packs the plastic so as to complete the press molding of the neck 25a. Substantially concurrently the rod 28 is raised and air pressure is introduced from line 27 through mandrel passage 26 to blow the plastic into engagement with the main portion of the mold cavity 29. Consequently, the head 20 may be lifted and the shear blade 15 slid across the bottom of the head to sever the extruded stream 21 from the plastic supply 21a in the head immediately following the closing of the mold 22.

It will be noted that the closing of the mold sections 22a and 22b does not pinch or close a tube since the plastic is a solid body or stream at the pinch-off point.

It will be understood that the tip 28a of the rod 28 may serve as a valve for controlling the flow of blowing air through the passage 26 and that either or both the blowing operation and the raising of the mandrel 24 to compression mold the bottle neck 25a may be effected after the mold 22 has been moved out of registry with the head 20 and replaced by another mold for a repetition of the bottle forming cycle.

It further is apparent that mold members 30a and 30b which form a cylinder for receiving the larger portion 24b of the mandrel, may be integral parts of, rather than separate members secured to their respective mold sections 22a and 22b. In either case, by raising the mandrel 24 plastic may be forced back into the neck mold cavity 29a and about the mandrel portion 24a thereby compression molding the inside and outside of the neck 26a and its lip or finish.

The bottle 25 may be readily removed when the mold sections 22a and 22b are opened either by retracting the mandrel 24 and rod 28 or by blowing the bottle off those members or, if desired, by a combination of the two.

A spray of a suitable lubricant, such as silicon oil, may be applied to the molding surface of the cavities and mandrel between molding operations, so as to facilitate removal of the bottles and prevent sticking.

It must be understood that large mouth ware and other blown products in addition to the narrow neck ware of the illustrative embodiments may be formed with the present invention.

Modifications other than those described with reference to the two embodiments shown in the drawing and heretofore described will be apparent to those skilled in the art within the meaning and scope of the appended claims defining the invention.

I claim:

1. The process of producing hollow articles of thermoplastic resin material which comprises extruding a charge of said material from an extruder orifice into an open multi-section mold and about a mandrel, severing the charge from the parent body of material in the extruder orifice at a point remote from the mandrel, closing the mold sections on a portion of said charge and about said mandrel to press mold said portion between said mold sections and mandrel, and introducing air pressure into said charge and blowing a portion of said charge into molding contact with said mold.

2. The process recited in claim 1 and wherein the severing of the charge from the parent body is effected by the closing of the mold prior to blowing.

3. The process recited in claim 1 and wherein the molds are closed and said severance is effected at a first location and the blowing is initiated at a different location.

4. The process recited in claim 1 and wherein said charge is extruded as a solid stream against said mandrel and the latter penetrates and forms a hollow passage in said stream.

5. The process recited in claim 1 and wherein said charge is extruded as a hollow tubular stream toward and about the mandrel.

6. The process recited in claim 1 and wherein said mandrel moves with said charge as the charge is extruded.

7. The process of producing hollow articles of thermoplastic resin material which comprises extruding a tubular charge of said material from an extruder orifice into an open multi-section mold and about a mandrel, closing the mold sections on said charge between said orifice and said mandrel, and introducing air pressure into said charge and blowing said charge into molding contact with said mold.

8. The process recited in claim 7 and wherein the charge is severed from the parent body prior to initiation of blowing.

References Cited in the file of this patent

UNITED STATES PATENTS

| 2,288,454 | Hobson | June 30, 1942 |
| 2,349,177 | Kopitke | May 16, 1944 |
| 2,503,171 | Posner | Apr. 4, 1950 |